United States Patent
Aloumanis et al.

(10) Patent No.: US 9,883,101 B1
(45) Date of Patent: Jan. 30, 2018

(54) PROVIDING A REAL-TIME VIA A WIRELESS COMMUNICATION CHANNEL ASSOCIATED WITH A PANORAMIC VIDEO CAPTURE DEVICE

(71) Applicant: VSN TECHNOLOGIES, INC., Fort Lauderdale, FL (US)

(72) Inventors: Peter Aloumanis, Boca Raton, FL (US); Moises De La Cruz, Miramar, FL (US); Tal Mor, Coral Springs, FL (US); Guillermo Padin, Coral Springs, FL (US); Amit Verma, Sunrise, FL (US)

(73) Assignee: HOYOS INTEGRITY CORPORATION, San Juan, PR (US)

( * ) Notice: Subject to any disclaimer, the term of this patent is extended or adjusted under 35 U.S.C. 154(b) by 341 days.

(21) Appl. No.: 14/339,083

(22) Filed: Jul. 23, 2014

(51) Int. Cl.
*H04N 5/232* (2006.01)
*G06T 3/00* (2006.01)
*G03B 37/06* (2006.01)
*G02B 13/06* (2006.01)

(52) U.S. Cl.
CPC ......... *H04N 5/23238* (2013.01); *G02B 13/06* (2013.01); *G03B 37/06* (2013.01); *G06T 3/0018* (2013.01); *G06T 3/0062* (2013.01)

(58) Field of Classification Search
CPC .... H04N 5/23238; G02B 13/06; G03B 37/00; G03B 37/06; G06T 3/0018; G06T 3/0062; G06T 3/0093; G06K 2009/363
USPC .................. 348/36, 39; 382/285, 293, 295
See application file for complete search history.

(56) References Cited

U.S. PATENT DOCUMENTS

| 5,185,667 A * | 2/1993 | Zimmermann | G06T 3/0018 348/143 |
| 5,384,588 A * | 1/1995 | Martin | G06F 17/30017 348/14.1 |
| 5,627,675 A * | 5/1997 | Davis | G02B 13/06 359/366 |
| 6,002,430 A * | 12/1999 | McCall | H04N 5/23238 348/143 |
| 6,243,099 B1 * | 6/2001 | Oxaal | H04N 5/23238 345/419 |
| 6,331,869 B1 * | 12/2001 | Furlan | H04N 5/2259 348/36 |

(Continued)

FOREIGN PATENT DOCUMENTS

JP 2000242773 A * 9/2000
KR 100624051 B1 * 9/2006

*Primary Examiner* — John Villecco
(74) *Attorney, Agent, or Firm* — Patents on Demand P.A.; Brian K. Buchheit

(57) ABSTRACT

A 360 degree panorama can capture a view of a real world environment. The view can be a 360 panorama which can conform to a stereographic projection. The capturing can be performed by a one shot panoramic video capture device lacking a display. A 360 degree arc frame can be analyzed to determine a one-to-one mapping to a target projection. The target projection can be a cylindrical or an equirectangular projection. The stereographic projection can be mapped to the target projection in real-time without performing a digital stitching operation within the device. Distortion in the target projection resulting from the mapping can be corrected. The target projection can be conveyed in real-time wirelessly to a display of a communicatively linked computing device.

14 Claims, 4 Drawing Sheets

(56) References Cited

U.S. PATENT DOCUMENTS

| | | | | |
|---|---|---|---|---|
| 6,333,826 B1* | 12/2001 | Charles | G02B 13/06 | 359/725 |
| 6,356,297 B1* | 3/2002 | Cheng | H04N 19/23 | 348/36 |
| 6,449,103 B1* | 9/2002 | Charles | G02B 13/06 | 359/366 |
| 6,466,254 B1* | 10/2002 | Furlan | H04N 5/2259 | 348/36 |
| 7,123,777 B2* | 10/2006 | Rondinelli | G06T 3/0062 | 359/725 |
| 7,271,803 B2* | 9/2007 | Ejiri | H04N 13/0278 | 345/427 |
| 7,382,399 B1* | 6/2008 | McCall | H04N 5/2254 | 348/207.99 |
| 7,747,105 B2* | 6/2010 | Koch | G06T 3/60 | 345/419 |
| 7,768,545 B2* | 8/2010 | Glatt | G03B 37/00 | 348/36 |
| 8,253,754 B2* | 8/2012 | Snyder | G06T 3/0031 | 345/441 |
| 8,670,001 B2* | 3/2014 | Comer | G06T 3/0018 | 345/419 |
| 8,798,451 B1* | 8/2014 | Kweon | G06T 3/0018 | 348/36 |
| 8,988,466 B2* | 3/2015 | Jin | G06T 3/40 | 345/634 |
| 9,395,526 B1* | 7/2016 | Abdala | G02B 17/08 | |
| 9,674,433 B1* | 6/2017 | De La Cruz | G02B 13/06 | |
| 9,723,206 B1* | 8/2017 | Aloumanis | H04N 5/23238 | |
| 9,762,795 B2* | 9/2017 | Kweon | H04N 5/23238 | |
| 2001/0010555 A1* | 8/2001 | Driscoll, Jr. | G02B 13/06 | 348/335 |
| 2002/0006000 A1* | 1/2002 | Kumata | G02B 13/06 | 359/853 |
| 2004/0001146 A1* | 1/2004 | Liu | G06K 9/00228 | 348/207.99 |
| 2004/0169724 A1* | 9/2004 | Ekpar | G06T 3/0062 | 348/36 |
| 2004/0252384 A1* | 12/2004 | Wallerstein | G02B 13/06 | 359/725 |
| 2005/0041094 A1* | 2/2005 | Gal | G02B 13/06 | 348/36 |
| 2005/0099500 A1* | 5/2005 | Fujita | H04N 5/23206 | 348/207.99 |
| 2005/0259146 A1* | 11/2005 | Berdugo | G02B 13/06 | 348/36 |
| 2007/0124783 A1* | 5/2007 | Ahiska | H04N 5/23206 | 725/105 |
| 2008/0049099 A1* | 2/2008 | Shih | G06T 3/0062 | 348/38 |
| 2008/0122922 A1* | 5/2008 | Geng | G08B 13/19628 | 348/39 |
| 2009/0041378 A1* | 2/2009 | Yamaoka | G06T 5/006 | 382/275 |
| 2009/0268046 A1* | 10/2009 | Ogawa | G06T 3/0018 | 348/222.1 |
| 2010/0053325 A1* | 3/2010 | Inagaki | G06T 3/0062 | 348/143 |
| 2010/0134621 A1* | 6/2010 | Namkoong | G02B 13/06 | 348/143 |
| 2011/0234832 A1* | 9/2011 | Ezoe | H04N 5/232 | 348/222.1 |
| 2012/0113029 A1* | 5/2012 | Ye | G06F 3/041 | 345/173 |
| 2012/0154518 A1* | 6/2012 | Zargarpour | G03B 17/565 | 348/36 |
| 2012/0162357 A1* | 6/2012 | Okegawa | G06T 3/0025 | 348/36 |
| 2012/0229596 A1* | 9/2012 | Rose | G06T 3/4038 | 348/36 |
| 2013/0002809 A1* | 1/2013 | Shimizu | H04N 5/23238 | 348/38 |
| 2014/0063181 A1* | 3/2014 | Lee | G06T 3/0025 | 348/36 |
| 2014/0168357 A1* | 6/2014 | Venable | G03B 37/04 | 348/38 |
| 2014/0340473 A1* | 11/2014 | Artonne | H04N 5/2252 | 348/36 |
| 2015/0062292 A1* | 3/2015 | Kweon | H04N 5/23238 | 348/37 |
| 2015/0170332 A1* | 6/2015 | Xu | H04N 5/23238 | 382/275 |
| 2016/0042244 A1* | 2/2016 | He | G06K 9/4614 | 382/199 |

\* cited by examiner

PROVIDING A REAL-TIME VIA A WIRELESS COMMUNICATION CHANNEL ASSOCIATED WITH A PANORAMIC VIDEO CAPTURE DEVICE

BACKGROUND

The present invention relates to the field of real-time streaming and, more particularly, to providing a real-time view via a wireless communication channel associated with a panoramic video capture device.

Providing high quality optics in a panoramic camera is challenging. Different approaches have been taken for this problem. One approach is to move a lens and to capture a set of images as the lens moves, which cover a field of view over time. The images from the moved lens are combined to form a panoramic scene. Another approach is to form an array of multiple different camera lenses and to combine the image results captured by the array of lenses into a single image. In this approach each lense captures a portion of the panoramic scene which is computationally composited together to form a panoramic image. Still another is to utilize an ultra-wide angle lens (e.g., a fish-eye lens) to capture a scene with a wider-than-normal field of view. Yet another is to use a panoramic optical device to create a 360 degree horizontal field of view using a single shot (a discrete point of time using a single lens). This later approach is sometimes referred to as a "one-shot" panoramic device, which captures a panoramic scene in a single point in time using a single lens. Each of these approaches has benefits and drawbacks depending on use cases.

Within one-shot solutions that use panoramic optical components, a number of approaches have been taken depending on situation. Frequently, these components permit a single 360 degree image of an environment to be captured. Images captured by this technique often conform to projections (e.g., spherical, fish eye) which distort perspective, shapes, and sizes of objects within the environment and the environment itself. Frequently, software correct using digital signal processing (DSP) techniques is employed to decrease distortion and increase image viewability. However, software correction distortion correction can be limited and often time consuming resulting in high latency between image capture and image display.

BRIEF SUMMARY

One aspect of the present invention can include a method for providing a real-time view via a wireless communication channel associated with a panoramic video capture device. A 360 degree panorama can capture a view of a real world environment. The view can be a 360 panorama which can conform to a stereographic projection. The capturing can be performed by a one shot panoramic video capture device lacking a display. A 360 degree arc frame can be analyzed to determine a one-to-one mapping to a target projection. The target projection can be a cylindrical or an equirectangular projection. The stereographic projection can be mapped to the target projection in real-time without performing a digital stitching operation within the device. Distortion in the target projection resulting from the mapping can be corrected. The target projection can be conveyed in real-time wirelessly to a display of a communicatively linked computing device.

Another aspect of the present invention can include a system for providing a real-time view via a wireless communication channel associated with a panoramic video capture device. A transform engine can be configured within a panoramic video capture device to transform each frame of a video feed to a target projection type resulting in a transformed frame being generated for each corresponding frame of the video feed. Each frame of the video feed can conform to a stereographic projection. The target projection type can be a cylindrical projection or an equirectangular projection. The transform can occurs in real-time. The video capture device can lack a display. The video capture device can convey the transformed frame wirelessly to a communicatively linked computing device. A data store can be configured to persist the video feed, a mapping, and the transformed frame.

Yet another aspect of the present invention can include a panoramic video capture device for providing a real-time view via a wireless communication channel. A panoramic video capture device can be configured to capture a continuous stereographic view of a real world environment. The view field can include a vertical range of negative fifteen degrees to positive forty five degrees and a horizontal range of at least two hundred and seventy degrees. The video capture device can lack a display. The video capture device can include, a wireless transceiver able to wirelessly convey the view to a communicatively linked computing device, an optical lense stack, a quadric reflector, an image sensor, an overhang enclosure, and a processor which can be configured to transform the stereographic view of the real world environment to a continuous equirectangular view of the real world environment in real-time.

DETAILED DESCRIPTION

Figure 1:
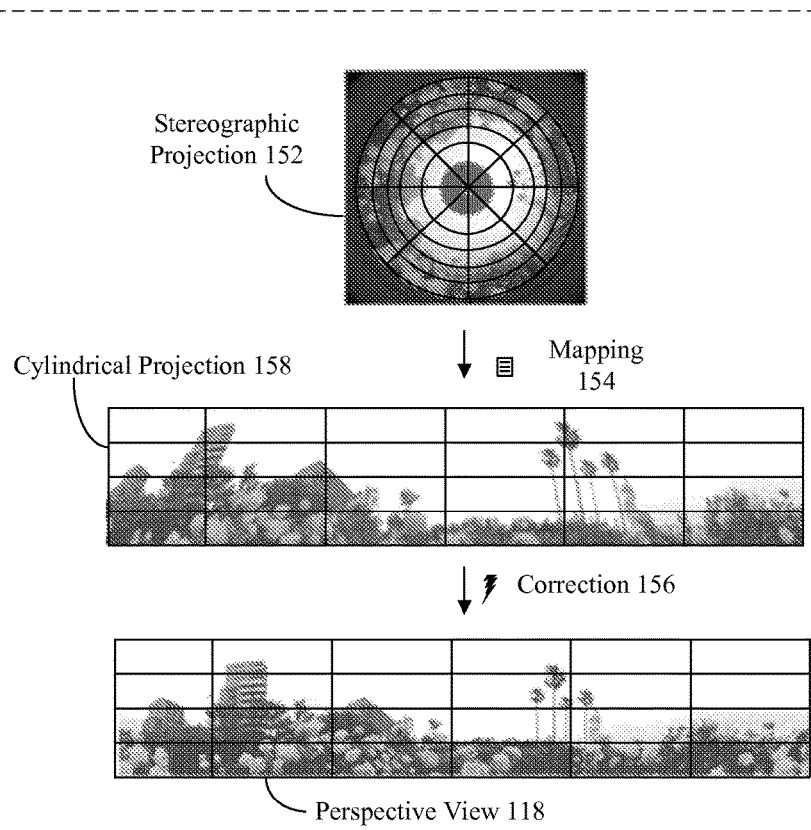
FIG. 1 is a schematic diagram illustrating a scenario and an associated real-time transform for providing a real-time view via a wireless communication channel associated with a panoramic video capture device in accordance with an embodiment of the inventive arrangements disclosed herein.

The present disclosure is a solution for providing a real-time view via a wireless communication channel associated with a panoramic video capture device. In the solution, a panoramic video capture device can capture a real-time view of a real world environment. The device can capture a stereographic projection of the real world environment which can be transformed to a cylindrical projection in real-time or near real-time without the stitching operations. The device can lack a display and can convey the cylindrical projection (e.g., real-time view/feed) to a wirelessly communicatively linked computing device. The computing device can present the cylindrical projection within an interface of a display.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a scenario 110 and an associated real-time transform for providing a real-time view via a wireless communication channel associated with a panoramic video capture device in accordance with an embodiment of the inventive arrangements disclosed herein. In scenario 110, a real-time transform 150 can be performed immediately upon capture of a 360° degree field of view 114 to provide a 360° perspective view 118 of environment 112.

As used herein, panoramic video capture device 116 can be a hardware/software device able to provide a real-time view 117 of an environment 112 via one or more wireless channels 124. Device 116 can include, but is not limited to, one or more lense elements, a lense stack, an aperture, a quadric reflector, and the like. Device 116 can capture a 360° field of view which can conform to a stereographic projection, curvilinear projection, and the like.

As used herein, stereographic projection 152 can be the projection of a sphere, as seen from the pole (e.g., polar panorama), onto a flat surface (e.g., light rays from 360° view 114 striking an image sensor). For example, a 360° view of environment 112 can be projected onto a display as a circular panorama with the center of the circular panorama lacking image information (e.g., blacked out). An equirectangular projection (e.g., equidistant cylindrical projection) can be a projection which can map meridans to vertical straight lines of constant spacing for vertical straight lines of constant spacing, and circles of latitude to horizontal straight lines of constant spacing for constant intervals of parallels.

As used herein, the term real-time, near real-time, and/or nearly real-time (NRT), in telecommunications and computing, can refer to the time delay introduced by automated data processing or network transmission, between the occurrence of an event and the use of the processed data. For example, the delay between view 114 capture and display upon device 120. It should be appreciated, a real-time or near real-time view 118 display depicts an event or situation as it existed at the current time minus the processing time, as nearly the time of the live event.

It should be appreciated that embodiment 150 can be performed in the context of scenario 110. As used herein, panoramic video capture device 116 can be a camera with a 360-degree field of view in the horizontal plane, or with a visual field that covers approximately the 360-degree field of view. Device 116 can be a panoramic camera with a field of view approximately equal or greater than 180° and/or an aspect ratio of greater than 2:1. In one instance, device 116 can be a one shot camera which can capture a panoramic field of view. For example, device 116 can be a 360° camera which can capture a region of 270° horizontally and 90° vertically. Device 116 can include a still camera mode, a video camera mode, and the like. In one instance, device 116 can be proximate to the environment 112. For example, device can be an omni-directional camera affixed to a SKYCAM camera system.

In one embodiment, device 116 can include geocoding capabilities (e.g., position and/or motion tracking capabilities). In the embodiment, device 116 can utilize native or non-native (e.g., third party devices, proximate devices) to perform geocoding. For example, device 116 can have a Global Positioning System (GPS) functionality able to tag an image with metadata based on the image creation location. In one instance, Exchangeable Image File format (Exif) data can be utilized to persist location data, metrics, and the like. That is, view 117 can include geotagging metadata which can indicate image/video properties including, but not limited to, latitude, longitude, altitude, bearing, distance, accuracy data, place names, and the like.

As used herein, wireless channel 124 can be one or more frequencies and/or speeds associated with a wireless transmission and/or a wireless network. Wireless networks can conform to, but is not limited to, cellular networks, wireless computer networks, and the like. In one instance, channel 124 can conform to WiFi direct, BLUETOOTH, and the like. It should be appreciated that channel 124 can include multiple channels.

In scenario 110, a panoramic video capture device 116 can be utilized to capture a 360 degree field of view 114 of a real world environment. The device 116 can be communicatively linked to a computing device 120 via one or more wireless channels 124. A real-time view 117 of environment 112 can be presented within interface 122 as a perspective view 118. That is, device 120 can view a live feed of real world environment 112 as captured by device 116. For example, live view 117 can be conveyed to device 120 via wireless channel 124.

In one embodiment, device 116 can capture environment within a stereographic projection 152 geometry. For example, projection 152 can present a view of environment 112 which can appear as a flat circular view (e.g., doughnut view).

In one embodiment, device 116 can perform one or more real time transforms 150 which can alter projection 152 to conform to a cylindrical projection 158 geometry.

In real-time transform 150, a stereographic projection 152 can be analyzed to produce a mapping 154 which can be utilized to alter the geometry of projection 152. It should be appreciated that transform 150 can occur in real-time or near real-time due to the lack of stitching operations required to perform the transform 150. In one embodiment, mapping 154 can permit projection 152 to be transformed to a cylindrical projection 158. In one instance, projection 158 can be automatically adjusted for anomalies resulting in the transform utilizing mapping 154. In the instance, correction 156 can be performed to eliminate distortion, digital artifacts, and the like. In one embodiment, a perspective view 118 of environment 112 can be generated from correction 156. It should be appreciated that correction 156 can be an optional operation within transform 150.

As used herein, cylindrical panoramas can have a horizontal field of view of up to 360 degrees. In the vertical direction can have a physical limit of 180 degrees, and a practical limit of about 120 degrees. All vertical straight lines can be preserved. For horizontal straight lines, only the horizon itself is a straight line in the cylindrical panorama. All other straight lines (including horizontal straight lines above or below the horizon) can be projected to a curved line in the panorama.

It should be appreciated that transform 150 is not limited to the geometries presented herein and can include traditional and/or non-traditional geometries (e.g., curvilinear, orthographic projection, equirectangular projection). That is, the disclosure can enable any projection type transform in real-time or near real-time. It should be appreciated that transform 150 and/or transmission of view 117 can include encryption, compression, and the like.

Drawings presented herein are for illustrative purposes only and should not be construed to limit the invention in any regard. It should be appreciated that the disclosure can support high dynamic range (HDR) imaging. It should be appreciated that the disclosure can utilize feature detection, calibration, blending, and the like to produce view 117. View 117 can conform to any traditional and/or proprietary formats including, but not limited to, Joint Photographic Experts Group (JPEG), Tagged Image File Format (TIFF), Moving Picture Experts Group (MPEG), Audio Video Interleave (AVI), Portable Network Graphics (PNG), and the like.

Figure 2:
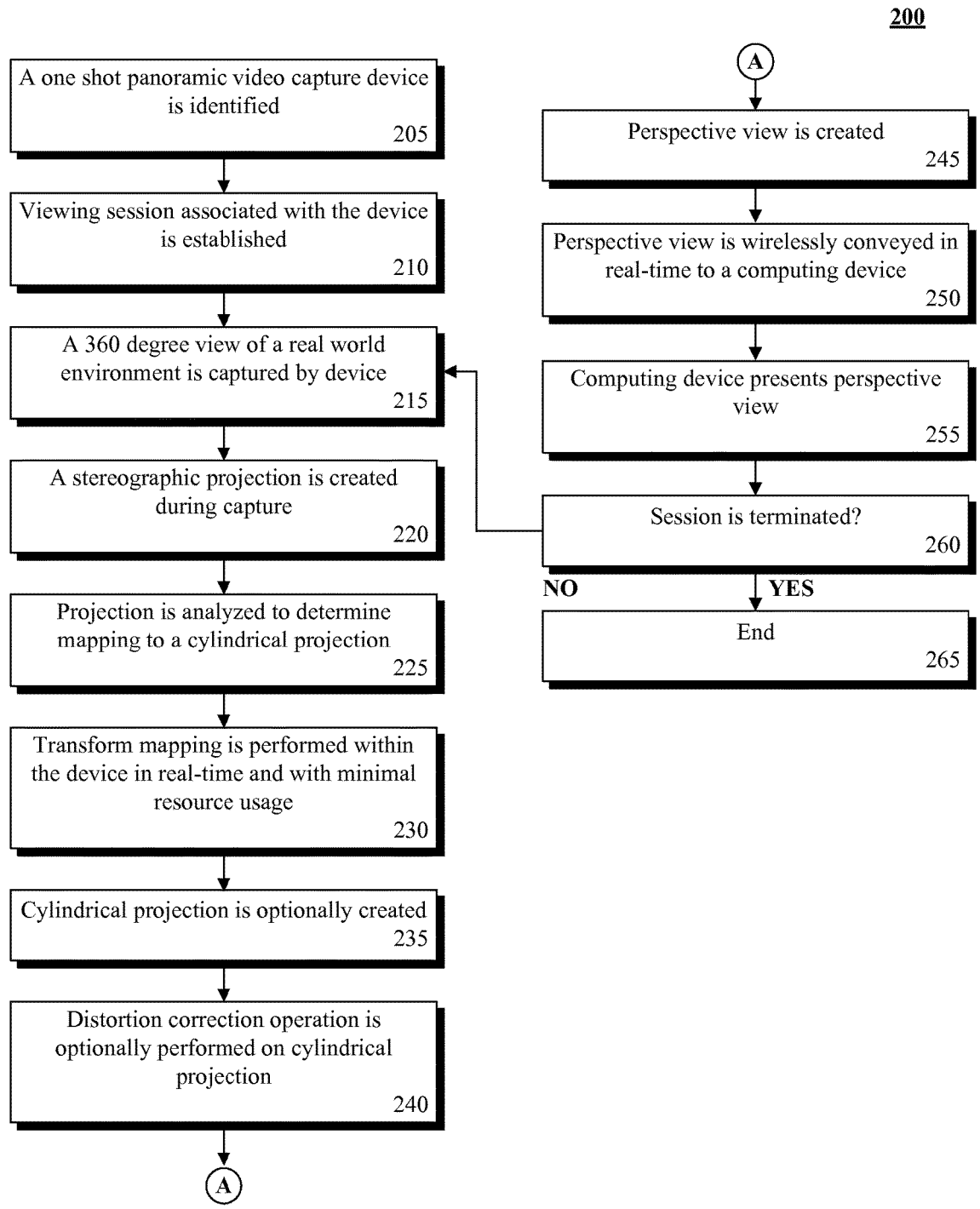
FIG. 2 is a flowchart illustrating a method for providing a real-time view via a wireless communication channel associated with a panoramic video capture device in accordance with an embodiment of the inventive arrangements disclosed herein.

FIG. 2 is a flowchart illustrating a method 200 for providing a real-time view via a wireless communication channel associated with a panoramic video capture device in accordance with an embodiment of the inventive arrangements disclosed herein.

In step 205, a one shot panoramic video capture device can be identified. In step 210, a viewing session associated with the device can be established. In step 215, a 360 degree view of a real world environment can be captured by the device. In step 220, a stereographic projection can be created during the capture. In step 225, the projection can be analyzed to determine a mapping to a cylindrical projection. In step 230, transform mapping is performed within the device in real-time and with minimal resource usage. In step 235, a cylindrical projection can be optionally created. In step 240, distortion correction operation can be optionally performed on the cylindrical projection. In step 245, a perspective view can be created. In step 250, the perspective view can be wirelessly conveyed in real-time to a computing device. In step 255, the computing device can present the perspective view 255. In step 260, if the session is terminated, the method can continue to step 265, else return to step 215. In step 265, the method can end.

Figure 3:
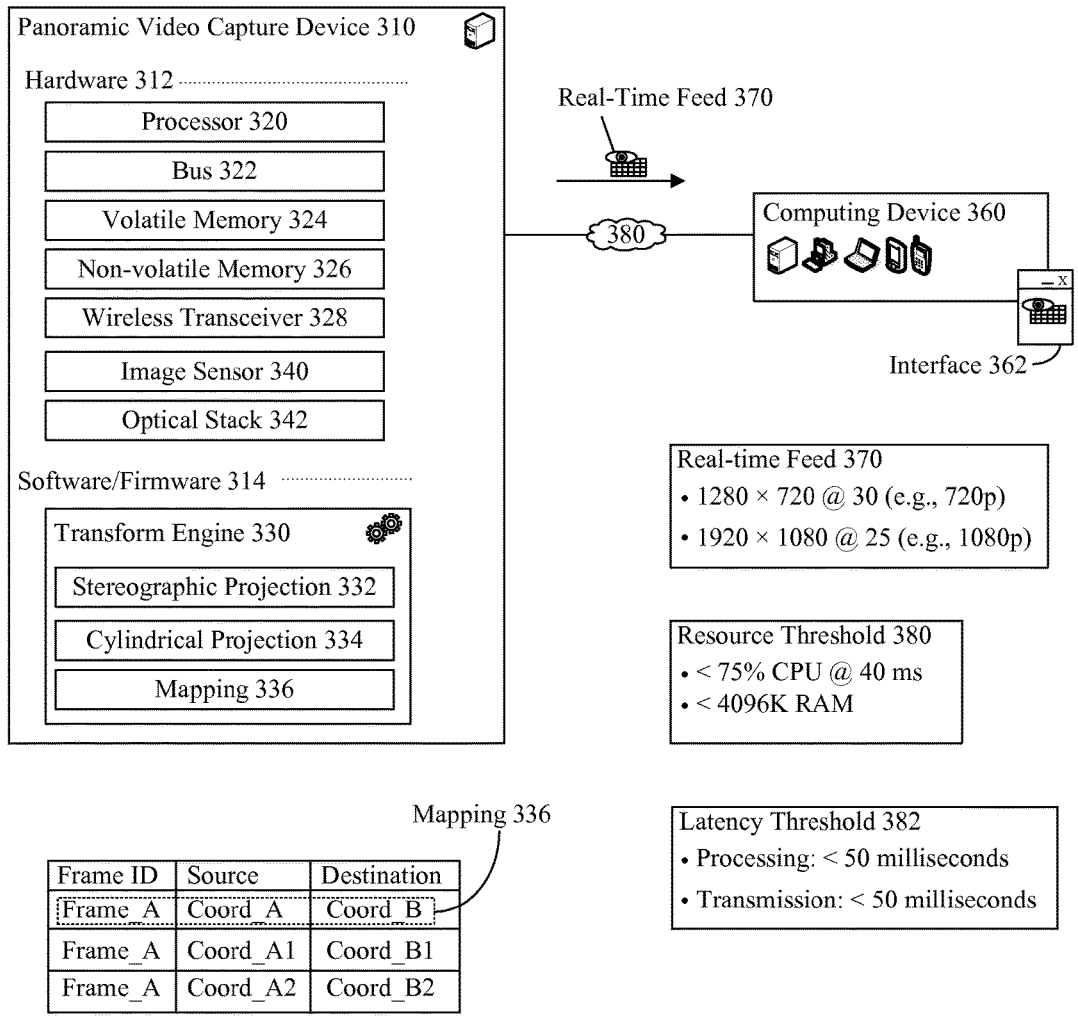
FIG. 3 is a schematic diagram illustrating a system for providing a real-time view via a wireless communication channel associated with a panoramic video capture device in accordance with an embodiment of the inventive arrangements disclosed herein.

FIG. 3 is a schematic diagram illustrating a system 300 for providing a real-time view via a wireless communication channel associated with a panoramic video capture device in accordance with an embodiment of the inventive arrangements disclosed herein. In system 300, a panoramic video capture device 310 can be wirelessly linked to a computing device 360. Device 310 can convey a real-time feed 370 to device 360 which can be presented within an interface 362. It should be appreciated that device 310 can lack a display. It should be understood that feed 370 can be captured and presented within a resource threshold 380 and/or a latency threshold 382. For example, the device 310 can capture and convey feed 370 within a total latency of less than 100 milliseconds (e.g., 50 milliseconds for processing and 50 milliseconds for transmission).

It should be appreciated that resource threshold 380 can be utilized to ensure low latency for real-time feed 370 delivery and/or presentation. For example, threshold 380 can be utilized to ensure each frame is processed within forty milliseconds while utilizing at least seventy five percent of available CPU cycles. It should be understood that resource threshold 380 can be an optional limitation.

Panoramic video capture device 310 can include a hardware 312 and a software/firmware 314. Device 310 can be communicatively linked via one or more wireless networks 380. Device 310 can transform a stereographic projection 332 to a cylindrical projection 334 via mapping 336 in real-time or near real-time using minimal computation resources. Projection 344 can be presented within device 360 as a continuous feed 370.

Hardware 312 can include, but is not limited to processor 320, bus 322, volatile memory 324, non-volatile memory 326, transceiver 328, image sensor 340, optical stack 342, and the like. In one embodiment, processor 320 can include one or more hardware accelerators for improving mapping transform operations. In one instance, memory 324, 326 can include memory buffers for enabling low latency real-time mapping and/or feed 370 delivery. Software/firmware 314 can include, but is not limited to, transform engine 330, settings (e.g., not shown), and the like. In one instance, optical stack 342 can include multiple lense elements for capturing a 360° view of an environment (e.g., FIG. 4B).

Transform engine 330 can be a hardware/software element able to convert stereographic projection 332 to a cylindrical projection 334 in real-time or near real-time. Engine 330 can include, but is not limited to, one or more transform algorithms, smoothing algorithms, video/image correction algorithms, and the like. For example, a rectangular or unweighted sliding-average smoothing operation can be applied to improve video viewability. In one instance, engine 330 can be a component of a Real Time operating system (e.g., QNX). In one embodiment, engine 330 can utilize one or more thresholds 380, 382 to ensure real-time transforms and/or feed delivery. Mapping 336 can be one or more data sets for transforming stereographic projection 332 to a cylindrical projection 334. Mapping 336 can include, but is not limited to, a frame identifier, a source element, a destination element, and the like. For example, mapping 336 can be utilized to re-organize pixels (e.g., location within a frame) based on the location within the projection 332. In one instance, mapping 336 can conform to a Gall stereographic projection operation and/or a Braun stereographic projection operation.

Real-time feed 370 can conform to one or more standard definition and/or high definition specifications. Feed 370 can include, but is not limited to, 1080p—1920×1080p: 2,073,600 pixels (~2.07 megapixels) per frame, 1080i—1920×1080i: 1,036,800 pixels (~1.04 MP) per field or 2,073,600 pixels (~2.07 MP) per frame, 720p—1280×720p: 921,600 pixels (~0.92 MP) per frame. In one instance, feed 370 can conform to a ultra high definition specification (e.g., UHD). For example, feed 370 can conform to a 3840×2160 pixel resolution at 30 frames per second. In one instance, feed 370 can include compression which can be utilized to minimize latency associated with feed 370 transmission and/or decoding. For example, feed 370 can utilize a High Efficiency Video Coding or a VP9 compression standard.

In one embodiment, device 310 can compensate for packet loss occurring within wireless network 380 utilizing traditional and/or proprietary packet delivery over lossy channel algorithms. In another embodiment, device 310 can compensate for bandwidth changes due to distance variations, network load, and the like.

In one embodiment, engine 330 can offload projection generation to computing device 360 to ensure real-time delivery. In the embodiment, projection 332 can be split each frame (e.g., Frame_A_Stereo) into two or more portions (e.g., Part_A_Stereo, Part_B_Stereo) which can be transformed to a projection 334 type (e.g., Part_A_Cyl, Part_A_Cyl). In the embodiment, each transformed portion can be conveyed to device 360 which can perform necessary stitching to present cylindrical projection 334 as a seamless frame (e.g., Frame_A_Cyl).

Drawings presented herein are for illustrative purposes only and should not be construed to limit the invention in any regard. It should be appreciated that the disclosure can utilize traditional and/or proprietary communication protocols including, but not limited to, RTP Control Protocol (RTCP), H.323, Hypertext Transport Protocol (HTTP), and the like.

Figure 4A:
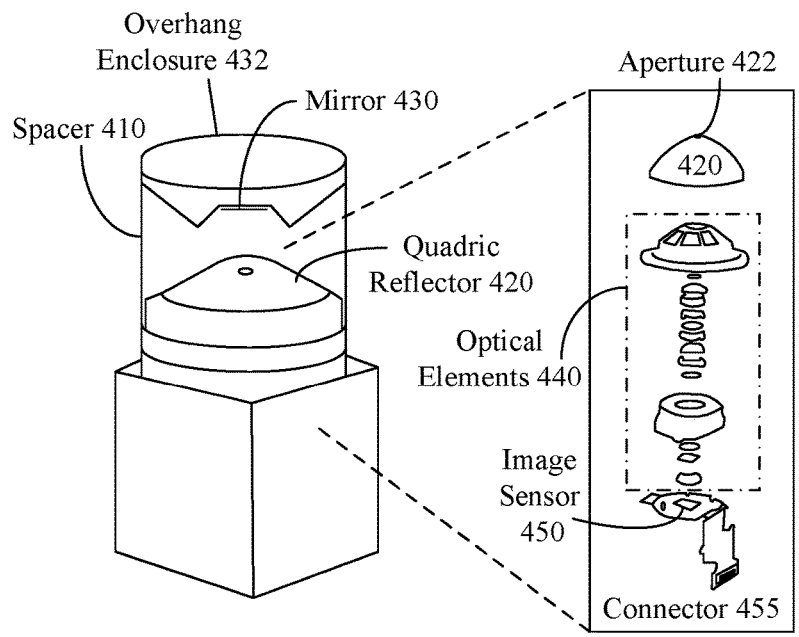
FIG. 4A is a schematic diagram illustrating a device for providing a real-time view via a wireless communication channel associated with a panoramic video capture device in accordance with an embodiment of the inventive arrangements disclosed herein.

Referring to FIG. 4A, a panoramic optical device is shown and described in accordance with embodiments of the disclosure. The device includes an overhang enclosure 432, a quadric reflector 420, a reflecting mirror 430, and a spacer 410, though which light passes. The quadric reflector 420 includes a hole or aperture 422 in its apex.

In one embodiment, a set of components included in a base of the panoramic optical device includes optical elements 440 and an image sensor 450 electrically coupled to connector 455. The optical elements 440 guide light reflected off mirror 420 to strike sensor 450. The optical elements may also filter undesired optical wavelengths, correct for color aberrations that would otherwise cause different colors to focus at different planes and positions, and/or ensure despite distortions from the quadric reflector 420 that the optical image substantially lays on a flat focal plane.

The overhang enclosure 432 can be utilized to restrict and/or eliminate secondary reflections from environmental light entering the aperture 422. In one instance, enclosure 432 material can include polymethyl methacrylate (PMMA, or acrylic), thermoplastic polymers, and the like.

The quadric reflector 420 is a reflective conical surface, which may be a parabolic surface, a hyperbolic surface, a hemispherical surface, or an elliptic surface. More specifically, the quadric reflector 420 as used herein is a non-degenerate real quadratic surface that tapers from a wide base towards an apex, where the aperture 422 is positioned.

The image sensor 450 is a component that converts an optical image into an electronic signal. Any of a variety of image sensors technologies can be for the image sensor 450 including, but not limited to, semiconductor charge-coupled devices (CCD), active pixel sensors in complementary metal-oxide-semiconductor (CMOS), and N-type metal-oxide-semiconductor (NMOS, Live MOS) technologies.

In one embodiment, positive elements of the optical elements 440 can be made from polymethyl methacrylate (PMMA, or acrylic), other transparent thermoplastic, glass, or other suitable substances. Negative ones of the optical elements 440 can be made of polycarbonate, other thermoplastic polymers, or other suitable substances.

Figure 4B:
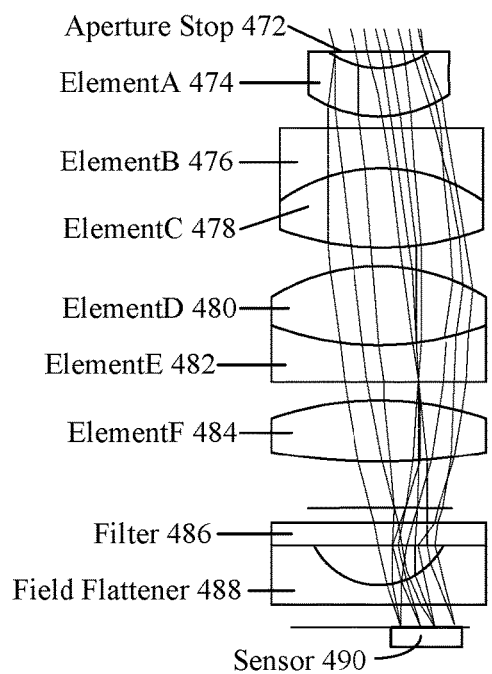
FIG. 4B is a schematic diagram illustrating an image stack for a device for providing a real-time view via a wireless communication channel associated with a panoramic video capture device in accordance with an embodiment of the inventive arrangements disclosed herein.

FIG. 4B shows optic elements between the aperture stop 472 and the image sensor 490 in accordance with embodiments of the disclosure. In FIG. 4B, the aperture stop 472 limits the bundle of light that passes through the optical elements. ElementA 474 captures light passing through the aperture stop and reduces its divergence. In one embodiment, cemented doublets can be formed from ElementB 476 and ElementC 478. ElementD 480 and ElementE 482 produce a converging beam and correct color aberrations that would otherwise cause different colors to be focused at different planes and positions. ElementF 484 increases convergence of the light. A flat filter 486 can be used to block infrared, violet, and ultraviolet radiation. The filtered wavelengths can blur the image and produce color rendering errors in some embodiments. The field flattener 488 corrects extreme field curvature in the virtual image within the quadric reflector 420. The field flattener 488 results in the image sent to the sensor 490 lying flat on a focal plane. Not all elements 472-488 are needed in all embodiments and further elements (not shown) may be included in different contemplated embodiment of the disclosure.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for presenting a 360 degree field of view comprising:

capturing a 360 degree panorama view of a real world environment as a stereographic projection, wherein the view is a 360 degree panorama, wherein the capturing is performed by a one shot panoramic video capture device in a video feed comprised of a plurality of frames, each frame generated from the stereographic projection;

transforming each frame by:

analyzing the stereographic projection to determine a one-to-one mapping to a target projection, wherein the target projection is at least one of a cylindrical projection or an equirectangular projection;

mapping the stereographic projection to the target projection within the panoramic video capture device;

correcting a distortion in the target projection resulting from the mapping to produce a corrected target projection showing a perspective view of the 360 degree panorama view, wherein the distortion results from the captured stereographic projection being mapped to the target projection;

wherein the transforming for each respective frame is performed within a resource threshold of less than forty milliseconds of processing time; and conveying the target projection for each frame in real-time wirelessly to a communicatively linked computing device.

2. The method of claim 1, wherein the panoramic video capture device lacks a display.

3. The method of claim 1, wherein the transforming further comprises:

applying a smoothing function to average out a pixel density of the target projection.

4. The method of claim 1, wherein the mapping further comprises:

determining a radial line of the stereographic projection starting at a center of the stereographic projection and ending at a boundary edge of of the stereographic projection; and deforming the stereographic projection resulting in the radial line becoming a vertical boundary edge.

5. A system for presenting a 360 degree field of view comprising:

a panoramic video capture device including a processor configured to execute a transform engine to transform each frame of a video feed to a target projection resulting in a transformed frame being generated for each corresponding frame of the video feed, wherein each frame of the video feed is captured as a stereographic projection of a 360 degree panorama view, wherein the target projection is at least one of a cylindrical projection or a equirectangular projection, wherein the transform occurs in real-time, wherein the video capture device conveys each transformed frame wirelessly to a communicatively linked computing device which displays the transformed frames as video;

a data store configured to persist at least one of the video feed, a mapping, and the transformed frame;

wherein the transform is performed within a resource threshold of less than forty milliseconds of processing time.

6. The system of claim 5, wherein the video capture device lacks a display.

7. The system of claim 5, wherein the processor is further configured to:

responsive to the transform, apply a smoothing function to average out the pixel density of the target projection.

8. The system of claim 5, wherein the processor is further configured to:

determine a radial line of the stereographic projection starting at a center of the stereographic projection and ending at a boundary edge of the stereographic projection; and deform the stereographic projection resulting in the radial line becoming a vertical boundary edge.

9. The system of claim 5, wherein each transformed frame is conveyed via a Real-Time Transport protocol to a proximate or remote computing device.

10. The system of claim 5, wherein the processor is further configured to:

prior to the transformed framed being conveyed, compress a set of transformed frames using a High Efficiency Video Coding (HEVC) or a VP9 coding for the conveyance.

11. A panoramic video capture device comprising:
a panoramic video capture device configured to capture a continuous 360 degree panorama view of a real world environment in a video feed comprised of a plurality of frames, wherein each frame is initially captured as a stereographic projection, wherein the continuous 360 degree panorama view comprises a vertical range of negative fifteen degrees to positive forty five degrees and a horizontal range of at least two hundred and seventy degrees, wherein the video capture devices lacks a display the video capture device further comprising:
a wireless transceiver able to wirelessly convey the view to a communicatively linked computing device;
an optical lens stack,
a quadric reflector having an aperture over the optical lens stack, and through which light passes into the optical lens stack,
an image sensor onto which light is projected through the optical lens stack,
an overhang enclosure made of a polymer, and in which is disposed a reflecting mirror, wherein the overhang enclosure blocks secondary reflections from entering the aperature, and
a processor configured to transform each stereographic projection for each frame of the 360 degree panoramic view to a continuous equirectangular view of the real world environment in real-time, wherein, to perform the transform, the processor is configured to map each stereographic projection to a target projection, and correct a distortion in the target projection that results upon being mapped to produce a corrected target projection as the equirectangular view of the 360 degree panorama view, wherein the distortion results from the captured stereographic projection being mapped to the target projection, wherein the transform for each frame occurs within a resource threshold time of less than forty milliseconds.

12. The video capture device of claim 11, wherein the processor is configured to compress at least one frame of the continuous equirectangular view using a High Efficiency Video Coding (HEVC) or a VP9 coding.

13. The video capture device of claim 11, wherein the continuous equirectangular view is conveyed via a Real-Time Transport protocol to a proximate or remote computing device.

14. The video capture device of claim 11, wherein the processor is configured to apply a smoothing function to average out the pixel density of the continuous equirectangular view.

* * * * *